(12) United States Patent
Kim et al.

(10) Patent No.: US 11,202,244 B2
(45) Date of Patent: Dec. 14, 2021

(54) ELECTRONIC DEVICE USING WIFI COMMUNICATION AND OPERATION METHOD THEREOF

(71) Applicant: SAMSUNG ELECTRONICS CO., LTD., Suwon-si (KR)

(72) Inventors: Saerome Kim, Suwon-si (KR); Maneesh Jain, Uttar Pradesh (IN); Nishant Chaprana, Uttar Pradesh (IN); Saurav Babu, Uttar Pradesh (IN); Heungryong Oh, Suwon-si (KR); Taesoo Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/575,798

(22) Filed: Sep. 19, 2019

(65) Prior Publication Data

US 2020/0100168 A1    Mar. 26, 2020

(30) Foreign Application Priority Data

Sep. 20, 2018    (KR) .......................... 10-2018-0113177

(51) Int. Cl.
| | | |
|---|---|---|
| *H04W 40/24* | (2009.01) | |
| *H04W 40/30* | (2009.01) | |
| *H04W 84/18* | (2009.01) | |
| *H04W 84/12* | (2009.01) | |

(52) U.S. Cl.
CPC ....... *H04W 40/244* (2013.01); *H04W 40/248* (2013.01); *H04W 40/30* (2013.01); *H04W 84/12* (2013.01); *H04W 84/18* (2013.01)

(58) Field of Classification Search
CPC . H04W 40/244; H04W 40/248; H04W 40/30; H04W 84/12; H04W 84/18
See application file for complete search history.

(56) References Cited

U.S. PATENT DOCUMENTS

| | | |
|---|---|---|
| 2006/0182076 A1 | 8/2006 | Wang |
| 2006/0245373 A1 | 11/2006 | Bajic |
| 2006/0268746 A1 | 11/2006 | Wijting et al. |
| 2007/0248104 A1 | 10/2007 | Rudolf et al. |
| 2007/0254596 A1* | 11/2007 | Corson ................. H04W 72/02 455/68 |
| 2009/0067373 A1 | 3/2009 | Kneckt et al. |

(Continued)

FOREIGN PATENT DOCUMENTS

KR    10-2016-0096526    8/2016

*Primary Examiner* — Duc C Ho

(74) *Attorney, Agent, or Firm* — Nixon & Vanderhye P.C.

(57) ABSTRACT

An electronic device according to various embodiments of the disclosure includes a communication circuit configured to perform wireless communication and a processor, wherein the processor is configured to control the electronic device to monitor a second beacon signal output from a second electronic device at preset intervals through the communication circuit, to determine that a network state of the second electronic device is an inactive state based on the second beacon signal not being received during a designated time, and to broadcast a first beacon signal including first information indicating that the network state of the second electronic device is the inactive state to at least one other electronic device through the communication circuit.

20 Claims, 20 Drawing Sheets

(56) References Cited

U.S. PATENT DOCUMENTS

| | | |
|---|---|---|
| 2009/0092115 A1 | 4/2009 | Zuniga |
| 2009/0116410 A1 | 5/2009 | Seok |
| 2009/0245163 A1 | 10/2009 | Inoue |
| 2009/0307483 A1 | 12/2009 | Falk et al. |
| 2012/0106532 A1 | 5/2012 | Bahr |
| 2012/0287834 A1 | 11/2012 | Fashandi et al. |
| 2013/0094538 A1 | 4/2013 | Wang |
| 2013/0107792 A1 | 5/2013 | Lam |
| 2014/0086129 A1 | 3/2014 | Gong et al. |
| 2014/0357227 A1 | 12/2014 | Lee |
| 2015/0023212 A1 | 1/2015 | Jing et al. |
| 2015/0334631 A1 | 11/2015 | Patil et al. |
| 2015/0358817 A1 | 12/2015 | Falk et al. |
| 2015/0382278 A1 | 12/2015 | Fallon et al. |
| 2016/0081131 A1 | 3/2016 | Walley et al. |
| 2017/0048785 A1 | 2/2017 | Ge et al. |
| 2017/0094445 A1* | 3/2017 | Shanmugam ....... H04L 41/0806 |
| 2017/0135145 A1 | 5/2017 | Amini et al. |
| 2018/0376448 A1* | 12/2018 | Wild ..................... H04W 64/00 |

* cited by examiner

ELECTRONIC DEVICE USING WIFI COMMUNICATION AND OPERATION METHOD THEREOF

CROSS-REFERENCE TO RELATED APPLICATION

This application is based on and claims priority under 35 U.S.C. § 119 to Korean Patent Application No. 10-2018-0113177, filed Sep. 20, 2018 in the Korean Intellectual Property Office, the disclosure of which is incorporated by reference herein in its entirety.

BACKGROUND

Field

The disclosure relates to an electronic device using wireless fidelity (WiFi) communication and an operation method of the electronic device.

Description of Related Art

With the development of wireless communication technologies, electronic devices have become capable of communicating with other electronic devices using various wireless communication technologies. A wireless fidelity (WiFi) communication technology may refer, for example, to a short-range wireless communication technology using electronic devices which are connected to each other to transmit and receive data or information to and from each other in a place where a wireless access device (e.g., an access point (AP)) is installed. Electronic devices may transmit and receive data to and from each other using the WiFi communication technology.

Through a wireless mesh network defined in the Institute of Electrical and Electronics Engineers (IEEE) 802.11s standard, wireless communication routers serving as antennas like in a wireless communication base station become nodes of the mesh network and thus wirelessly connect all sections. The wireless mesh network enables a wired mesh network architecture to be implemented in a wireless network, thus overcoming a limitation of existing wireless communication.

Conventionally, there is no way for an electronic device to accurately identify an adjacent electronic device when the adjacent electronic device abnormally enters an inactive state, among electronic devices included in a wireless mesh network using WiFi communication.

The above information is presented as background information only to assist with an understanding of the present disclosure. No determination has been made, and no assertion is made, as to whether any of the above might be applicable as prior art with regard to the present disclosure.

SUMMARY

According to various embodiments of the disclosure, an electronic device capable of determining whether an adjacent electronic device included in a wireless mesh network using, for example, WiFi communication is an inactive state when the adjacent electronic device is suddenly powered off or is not in a normal state and an operation method of the electronic device are provided.

An electronic device according to various example embodiments of the disclosure includes a communication circuit configured to perform wireless communication and a processor, in which the processor is configured to control the electronic device to: monitor a second beacon signal output from a second electronic device at preset intervals through the communication circuit, to determine that a network state of the second electronic device is an inactive state based on the second beacon signal not being received during a designated time, and to broadcast a first beacon signal including first information indicating that the network state of the second electronic device is the inactive state to at least one other electronic device through the communication circuit.

An method of operating an electronic device according to various example embodiments of the disclosure includes monitoring a second beacon signal output from a second electronic device at preset intervals through a communication circuit of the electronic device, determining that a network state of the second electronic device is an inactive state based on the second beacon signal not being received during a designated time, and broadcasting a first beacon signal including first information indicating that the network state of the second electronic device is the inactive state to at least one other electronic device through the communication circuit.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Hereinafter, various example embodiments of the present disclosure will be described in greater detail with reference to the accompanying drawings.

Figure 1:
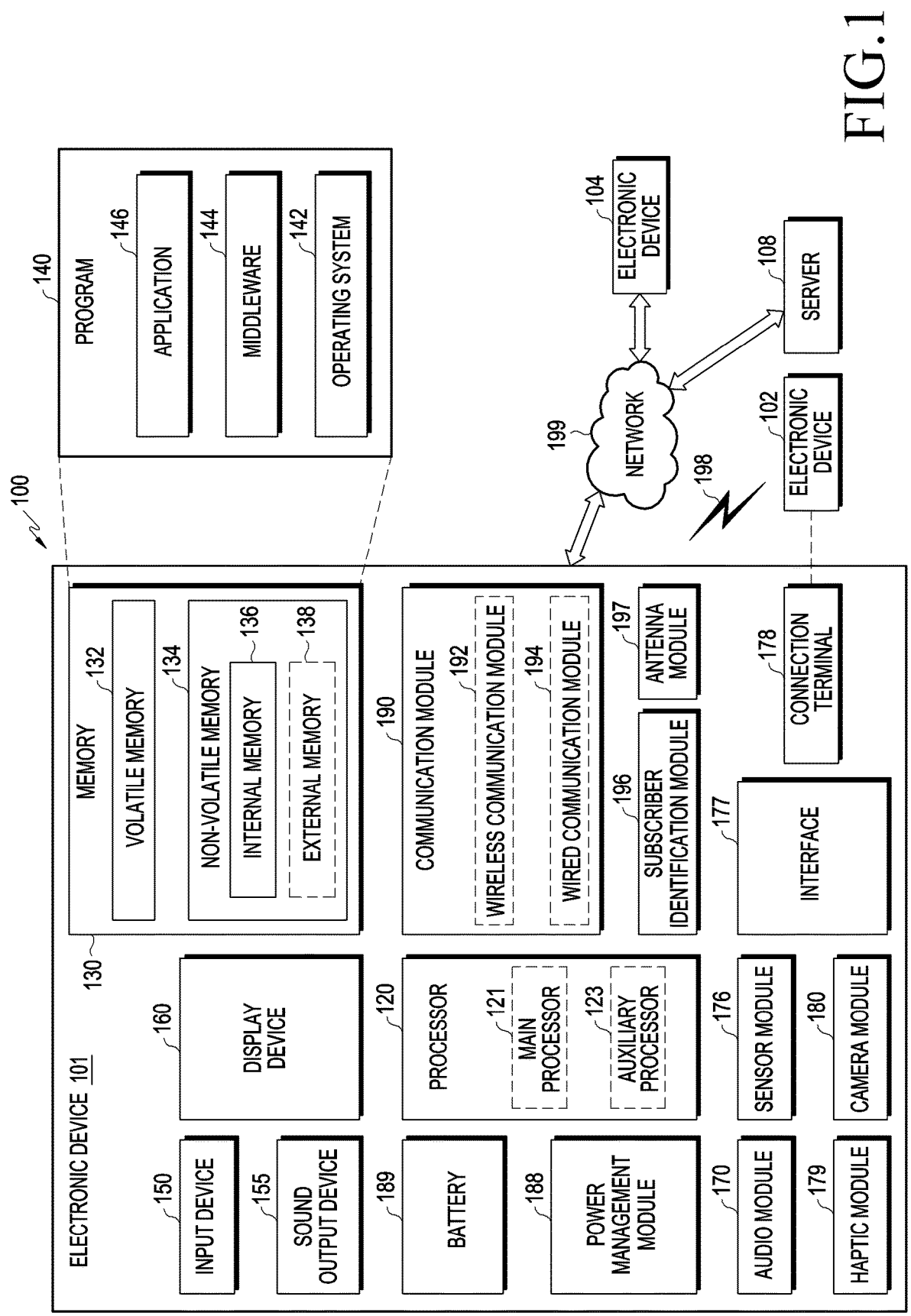
FIG. 1 is a block diagram illustrating an example electronic device in a network environment, according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Terms described in the disclosure may be the same or similar to those proposed in the Bluetooth standard and/or IEEE 801.11 standards. However, the technical spirit of the disclosure is not limited thereto.

Figure 2A:
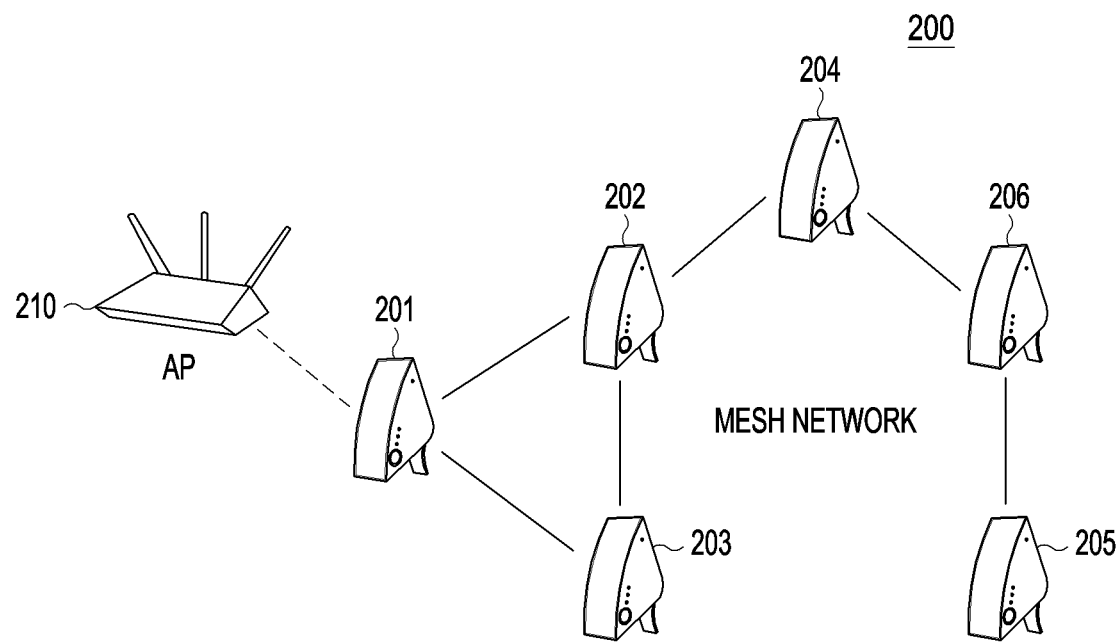
FIG. 2A is a diagram illustrating an example mesh network, according to various embodiments of the disclosure.

FIG. 2A is a diagram illustrating an example mesh network, according to various embodiments of the disclosure.

Referring to FIG. 2A, an electronic system 200 may be implemented substantially similarly or identically to the network environment 100 of FIG. 1. First through sixth electronic devices 201, 202, 203, 204, 205, and 206 each may be implemented substantially similarly or identically to the electronic device 101, 102, or 104 of FIG. 1.

According to various embodiments, the first through sixth electronic devices 201, 202, 203, 204, 205, and 206 may form a mesh network with one another. The first through sixth electronic devices 201, 202, 203, 204, 205, and 206 each may transmit and receive data to one another through the mesh network. For example, the mesh network may be a wireless mesh network using wireless fidelity (WiFi) communication. WiFi communication is used herein by way of non-limiting example and for ease of explanation and description. However, the disclosure is not limited thereto, and any suitable wireless communication technology may be used. A technology proposed in the Institute of Electrical and Electronics Engineers (IEEE) 802.11s standard may be applied to the wireless mesh network using WiFi communication.

To technologies related to the mesh network (or a wireless mesh network) in the disclosure, the technology proposed in the IEEE 802.11s standard may be applied. Terms or expressions of the technologies related to the mesh network (or a wireless mesh network) described in the disclosure may be the same or similar to the technology proposed in the IEEE 802.11s standard.

According to various embodiments, the first through sixth electronic devices 201, 202, 203, 204, 205, and 206 each may be implemented as a node or a peer of the mesh network. Each of the peers 201, 202, 203, 204, 205, and 206 of the mesh network may be connected with an access point (AP) 210. Each of the peers 201, 202, 203, 204, 205, and 206 of the mesh network may perform a relay function for data transmitted to a particular peer. The data transmitted to the particular peer may be transmitted through a route or path that may dynamically change between a source and a destination. The peers 201, 202, 203, 204, 205, and 206 each may periodically find the best path between a source and a destination. The peers 201, 202, 203, 204, 205, and 206 each may update information and routing information of adjacent peers.

According to various embodiments, the first electronic device 201 may be connected with the AP 210. The first electronic device 201 may transmit data received from the AP 210 to other electronic devices (e.g., the second through sixth electronic devices 202 through 206). For example, the first electronic device 201 may be implemented as a mesh portal or a mesh gate. The mesh portal or the mesh gate may, for example, transmit a beacon signal including information about the mesh network at preset intervals. The mesh portal or the mesh gate may receive a beacon signal output from adjacent another mesh station or mesh point.

The second through sixth electronic devices 202 through 206 may receive data from the first electronic device 201. For example, the second electronic device 202 and the third electronic device 203 may directly receive data from the first electronic device 201, and the fourth electronic device 204 and the fifth electronic device 205 may receive data from the first electronic device 201 through the second electronic device 202 or the third electronic device 203. For example, the second through sixth electronic devices 202 through 206 may be implemented, for example, and without limitation, as one of a mesh access point, a mesh point, a mesh station, or the like. The mesh station and/or the mesh point may transmit a beacon signal including information about the mesh network at preset intervals. The mesh station and/or the mesh point may receive a beacon signal output from another adjacent mesh station and/or mesh point (or mesh portal).

Figure 2B:
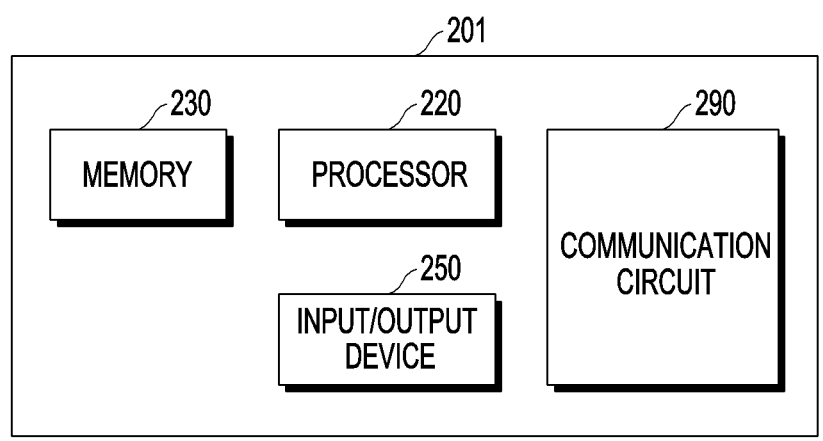
FIG. 2B is a block diagram illustrating an example electronic device according to various embodiments of the disclosure.

FIG. 2B is a block diagram illustrating an example electronic device according to various embodiments of the disclosure.

Referring to FIG. 2B, the first electronic device 201 may be implemented substantially similarly or identically to the first electronic device 201 of FIG. 2A. In relation to the first electronic device 201 of FIG. 2B, the first electronic device 201 of FIG. 2A has been described, but other electronic devices 202, 203, 204, 205, and 206 of FIG. 2A may also be implemented substantially similarly or identically to the first electronic device 201 of FIG. 2B.

The processor 220 may include various processing circuitry and control overall operations of the first electronic device 201. The processor 220 may be implemented substantially similarly or identically to the processor 120 of FIG. 1.

According to various embodiments, the processor 220 may monitor a second beacon signal output, for example, at preset intervals from a second electronic device adjacent to or within a specified communication distance of (as used herein, the term "adjacent" when referring to the electronic devices includes electronic devices within a specified or predetermined communication distance of another electronic device and is not limited to being directly adjacent) the first electronic device 201 through a communication circuit 290. For example, the processor 220 may determine whether the second beacon signal output at preset intervals from the adjacent second electronic device (e.g., 202 or 203). For example, the second beacon signal may refer, for example, to a beacon signal output from the second electronic device.

According to various embodiments, when a beacon signal is not received from the second electronic device (e.g., 202 or 203) adjacent to the first electronic device 201 during a designated time, the processor 220 may determine a network state of the second electronic device to be an inactive state. For example, the designated time may be a time that is a criterion for determining whether the network state of the second electronic device is the inactive state. The designated time may be determined based on the intervals at which the beacon signal is output from the second electronic device. Based on the above, the electronic device 201 may determine whether the network state of the second electronic device is the inactive state.

According to various embodiments, the processor 220 may add first information indicating that the network state of the second electronic device is the inactive state to the first beacon signal output from the first electronic device 201. For example, the processor 220 may add the first information to a vendor specific information element (VSIE) of the first beacon signal. The first beacon signal may refer, for example, to a beacon signal output from the first electronic device 201.

According to various embodiments, the processor 220 may broadcast the first beacon signal including the first information indicating that the network state of the second electronic device is the inactive state to at least one electronic device adjacent to the first electronic device 201 through the communication circuit 290. Based on the above, the first electronic device 201 may inform the at least one adjacent electronic device that the network state of the second electronic device is the inactive state.

According to various embodiments, the processor 220 may add the first information indicating that the network state of the second electronic device is the inactive state to a VSIE of an action frame output from the first electronic device 201. The processor 220 may transmit the action frame including the first information indicating that the network state of the second electronic device is the inactive state to the at least one electronic device adjacent to the first electronic device 201 through the communication circuit 290.

According to various embodiments, the processor 220 may change a path including the second electronic device into the inactive state when determining that the network state of the adjacent second electronic device is the inactive state. For example, as the processor 220 changes the route including the second electronic device into the inactive state, the processor 220 may update a routing path for the mesh network. For example, the processor 220 may update the routing path by excluding the path including the second electronic device and reset the routing path.

According to various embodiments, the processor 220 may transmit information about the updated routing path to the adjacent at least one electronic device. For example, the processor 220 may add the information about the updated routing path to the first beacon signal and broadcast the first beacon signal to the at least one electronic device adjacent to the first electronic device 201.

According to various embodiments, when the mesh network is formed, the processor 220 may store information about electronic devices included in the mesh network in the memory 230. For example, the processor 220 may store intervals at which a beacon signal is output from each of the electronic devices 202 through 206 included in the mesh network. The processor 220 may store information about a designated time for the beacon signal output from each of the electronic devices 202 through 206 included in the mesh network.

According to various embodiments, the memory 230 may store information about the electronic devices included in the mesh network. The memory 230 may store information about the routing path updated by the processor 220.

The input/output device 250 may include various input/output circuitry and receive an input with respect to the electronic device 201 and output information of the electronic device 201.

According to various embodiments, the communication circuit 290 may form a mesh network (e.g., a WiFi wireless mesh network) including at least one of the electronic devices. The communication circuit 290 may transmit and receive data (or a signal) to and from the electronic devices included in the mesh network. For example, the communication circuit 290 may receive a beacon signal (e.g., the second beacon signal) output at preset intervals from at least one adjacent electronic device. The communication circuit 290 may broadcast a beacon signal (e.g., the first beacon signal) to the at least one adjacent electronic device. For example, the communication circuit 290 may include a communication circuit performing WiFi communication.

Figure 3:
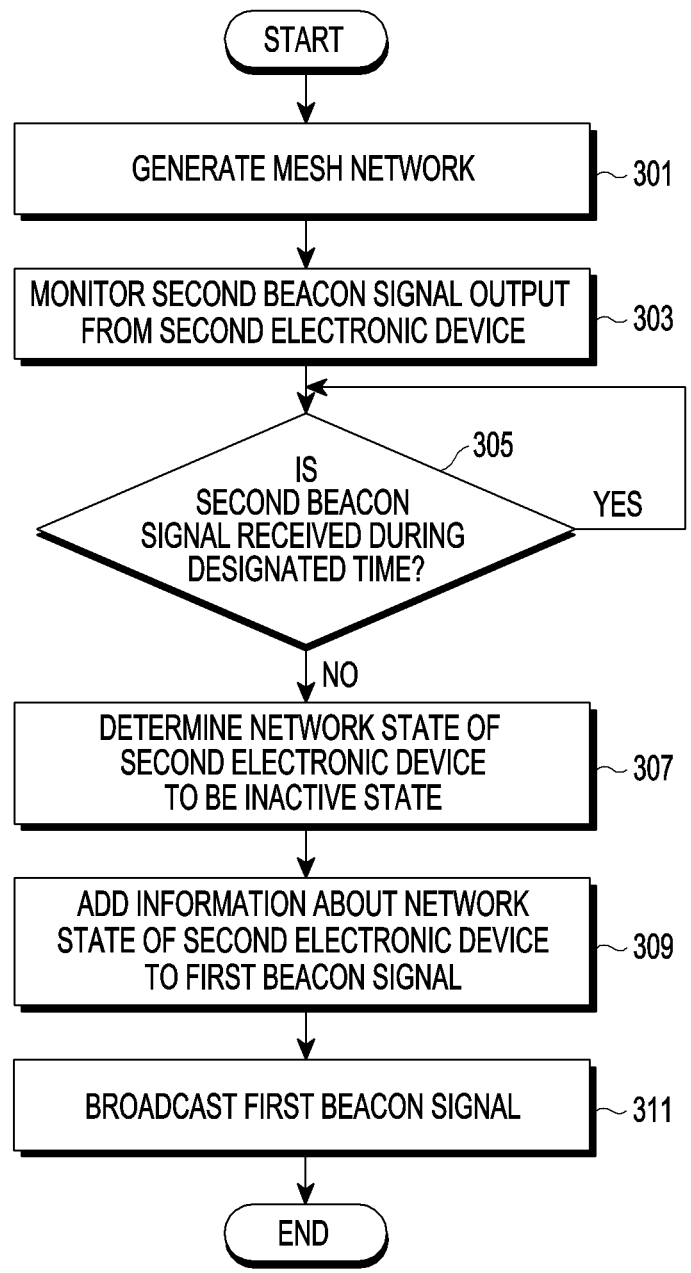
FIG. 3 is a flowchart illustrating an example operation of an electronic device, according to various embodiments of the disclosure.

FIG. 3 is a flowchart illustrating an example operation of an electronic device, according to various embodiments of the disclosure.

Referring to FIG. 3, an electronic device (e.g., the first electronic device 201 of FIGS. 2A and 2B) may generate (or form) a mesh network in operation 301.

According to various embodiments, the electronic device 201 may monitor a second beacon signal output from a second electronic device (e.g., 202 of FIG. 2A) in operation 303.

According to various embodiments, the electronic device 201 may determine whether the second beacon signal is received during a designated time in operation 305. The electronic device 201 may identify the network state of the second electronic device 202 based on whether the second beacon signal is received during the designated time in operation 305. The electronic device 201 may determine the network state of the second electronic device 202 to be the inactive state, when the second beacon signal is not received during the designated time, in operation 307. The electronic device 201 may determine the network state of the second electronic device 202 to be an active state, when the second beacon signal is received during the designated time.

According to various embodiments, the electronic device 201 may identify the network state of the second electronic device 202 based on whether a preset number of beacon signals are received from the second electronic device 202 during a designated time. For example, the electronic device 201 may determine the network state of the second electronic device 202 to be the inactive state, when the preset number of beacon signals are not received from the second electronic device 202 during the designated time. The electronic device 201 may determine the network state of the second electronic device 202 to be the active state, when the preset number of beacon signals are received from the second electronic device 202 during the designated time.

According to various embodiments, the electronic device 201 may add information about the network state of the second electronic device to, for example, the VSIE of the first beacon signal in operation 309. For example, the electronic device 201 may add information indicating that the network state of the second electronic device is the inactive state to the VSIE of the first beacon signal.

According to various embodiments, the electronic device 201 may broadcast the first beacon signal to at least one electronic device adjacent to (e.g., within a specified communication distance of) the electronic device 201 through a communication circuit (e.g., the communication circuit 290 of FIG. 2) in operation 311. The first electronic device 201 may inform at least one electronic device adjacent to the electronic device 201 that the network state of the second electronic device is the inactive state, using the beacon signal.

Figure 4:
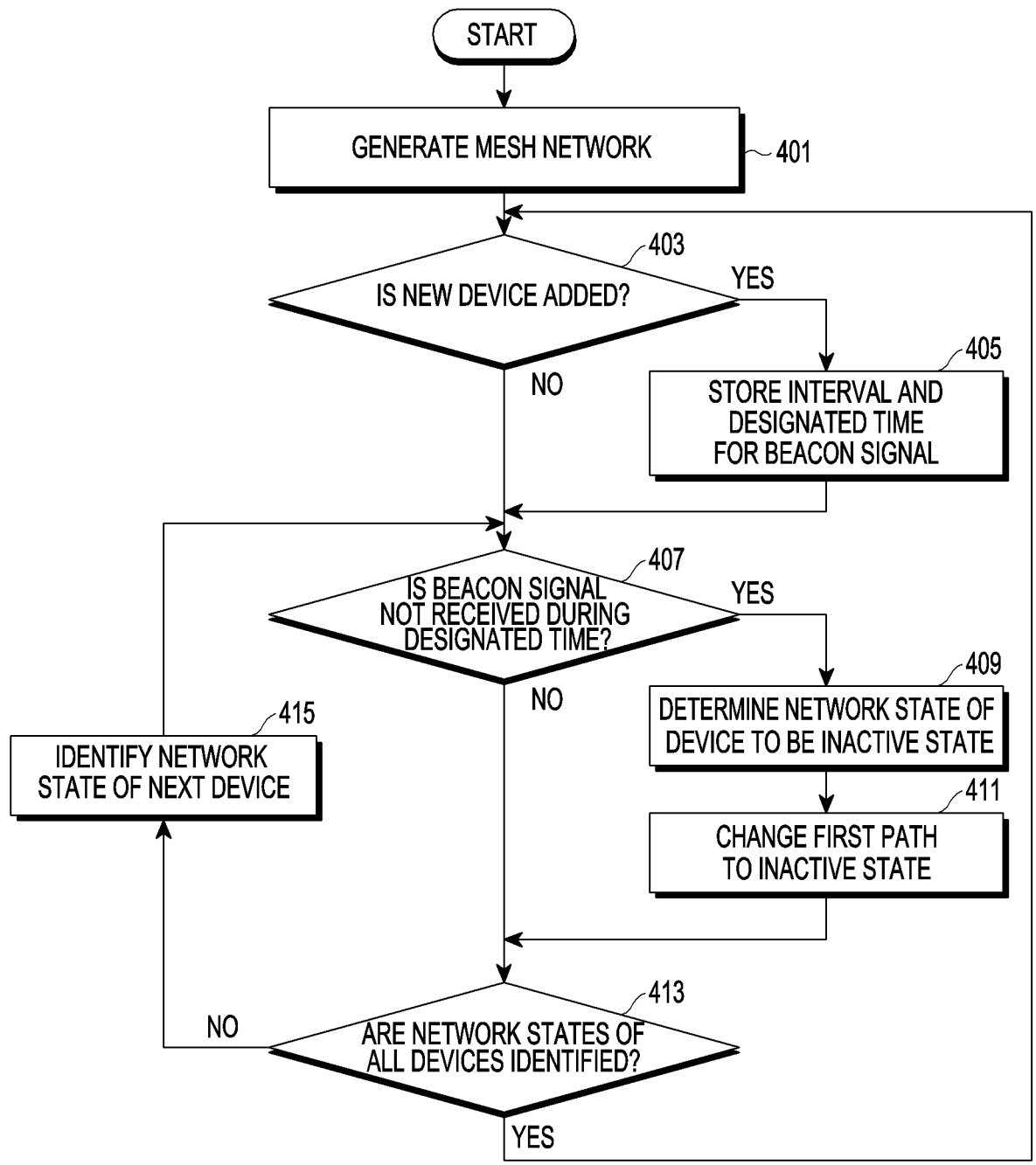
FIG. 4 is a flowchart illustrating an example operation of determining a network state of electronic devices that are adjacent to a first electronic device, according to various embodiments of the disclosure.

FIG. 4 is a flowchart illustrating an example operation of determining a network state of electronic devices that are adjacent to a first electronic device, according to various embodiments of the disclosure.

Referring to FIG. 4, an electronic device (e.g., the first electronic device 201 of FIGS. 2A and 2B) may generate (or form) a mesh network including a plurality of electronic devices, in operation 401. For example, the first electronic device 201 may generate the mesh network (e.g., a WiFi mesh network) based on information about the mesh network stored in a memory (e.g., the memory 230 of FIG. 2B).

The first electronic device 201 may determine whether a new device is added to the mesh network, in operation 403. For example, the first electronic device 201 may determine whether the new device is added to the mesh network, based on whether an event "CMD_NEW_STATION" is received through a driver interface of a wpa_supplicant module. For example, the first electronic device 201 may determine that the new device is added to the mesh network, when the event "CMD_NEW_STATION" is received through the driver interface of the wpa_supplicant module.

When determining that the new device is added, the first electronic device 201 may store interval information and a designated time for the new device in operation 405. For example, the first electronic device 201 may store interval information indicating preset intervals at which the new device outputs a beacon signal. The first electronic device 201 may store a designated time that is a reference time (or a threshold time) for determining whether the new device is inactive.

The first electronic device 201 may monitor a beacon signal output from any one (e.g., the second electronic device 202) of the plurality of electronic devices included in the mesh network. For example, the first electronic device 201 may determine whether a second beacon signal output at preset intervals from the second electronic device 202 included in the mesh network is not received during a designated time, in operation 407. The first electronic device 201 may determine whether a preset number of second beacon signals are not received from the second electronic device 202 during the designated time.

When the second beacon signal is not received during the designated time (yes in operation 407), the first electronic device 201 may determine that the network state of a corresponding device (e.g., the second electronic device 202) is the inactive state, in operation 409. For example, the first electronic device 201 may deliver an event "CMD_DEL_STATION" of the wpa_supplicant module to an upper layer, a user application. For example, the first electronic device 201 may determine that the second electronic device 202 among the plurality of electronic devices is in the inactive state, by transmitting the event "CMD_DEL_STATION" of the wpa_supplicant module to the user application.

The first electronic device 201 may change a first path including the second electronic device among a plurality of paths included in the mesh network into the inactive state, in operation 411. The first electronic device 201 may update a routing path except for the first path among the plurality of paths included in the mesh network, and reset the updated routing path.

The first electronic device 201 may determine whether network states of all devices included in the mesh network are identified, in operation 413. For example, the first electronic device 201 may determine whether the network states of all the devices (or peers) included in the mesh network are identified.

When the network states of all the devices are not identified (no in operation 413), the first electronic device 201 may identify a network state of a next device in operation 415. When the network states of all the devices are identified (yes in operation 413), the first electronic device 201 may in real time or periodically determine whether a new device is added.

FIGS. 5A, 5B, 5C and 5D are diagrams illustrating an example beacon signal output from a first electronic device, according to various embodiments of the disclosure.

Referring to FIGS. 5A, 5B, 5C and 5D (which may be referred to hereinafter as FIGS. 5A through 5D), a first electronic device (e.g., the first electronic device 201 of FIG. 2A) may add information indicating a network state of at least one electronic device adjacent to the first electronic device 201 to a first beacon signal (e.g., the VSIE of the first beacon signal). The first electronic device 201 may broadcast the first beacon signal including the network state of the at least one electronic device.

According to various embodiments, the first electronic device 201 may broadcast a beacon signal including information in various forms described in FIGS. 5A through 5D. The first electronic device 201 may broadcast a beacon signal including at least one of plural information described in FIGS. 5A through 5D. However, the technical spirit of the disclosure is not limited thereto, such that a beacon signal in various forms including a network state of at least one electronic device included in a mesh network may be applied.

Figure 5A:
FIGS. 5A, 5B, 5C and 5D are diagrams illustrating an example beacon signal output from a first electronic device, according to various embodiments of the disclosure.

Referring to FIG. 5A, a first beacon signal (e.g., the VSIE of the first beacon signal) 501 may include first information 511 indicating a network state of a second electronic device, second information 512 indicating a network state of a third electronic device, and third information 513 indicating a network state of a fourth electronic device. For example, the first information 511 may include a medium access control (MAC) address of the second electronic device and information indicating that the network state of the second electronic device is the "inactive state", the second information 512 may include a MAC address of the third electronic device and information indicating that the network state of the third electronic device is the "active state", and the third information 513 may include a MAC address of the fourth electronic device and information indicating that the network state of the fourth electronic device is the "active state".

Figure 5B:

Referring to FIG. 5B, a first beacon signal (e.g., the VSIE of the first beacon signal) 502 may include first information 521 indicating the network state of the second electronic device, second information 522 indicating the network state of the third electronic device, and third information 523 indicating the network state of the fourth electronic device. For example, the first information 521 may include the MAC address of the second electronic device and information indicating the number of beacon signals (e.g., 12) that are output from the second electronic device, but are not normally received, the second information 522 may include the MAC address of the third electronic device and information indicating the number of beacon signals (e.g., 0) that are output from the third electronic device, but are not normally received, and the third information 523 may include the MAC address of the fourth electronic device and information indicating the number of beacon signals (e.g., 0) that are output from the fourth electronic device, but are not normally received.

Figure 5C:
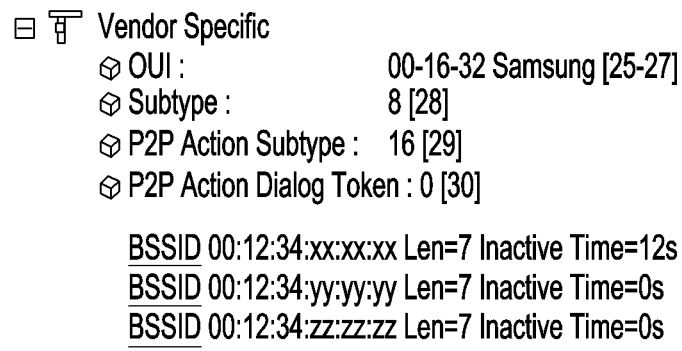

Referring to FIG. 5C, a first beacon signal (e.g., the VSIE of the first beacon signal) 503 may include first information 531 indicating the network state of the second electronic device, second information 532 indicating the network state of the third electronic device, and third information 533 indicating the network state of the fourth electronic device. For example, the first information 531 may include the MAC address of the second electronic device and information indicating a time (e.g., 12 seconds) during which a beacon signal output from the second electronic device is not received, the second information 532 may include the MAC address of the third electronic device and information indicating a time (e.g., 0 second) during which a beacon signal output from the third electronic device is not received, and the third information 533 may include the MAC address of the fourth electronic device and information indicating a time (e.g., 0 second) during which a beacon signal output from the fourth electronic device is not received.

Figure 5D:
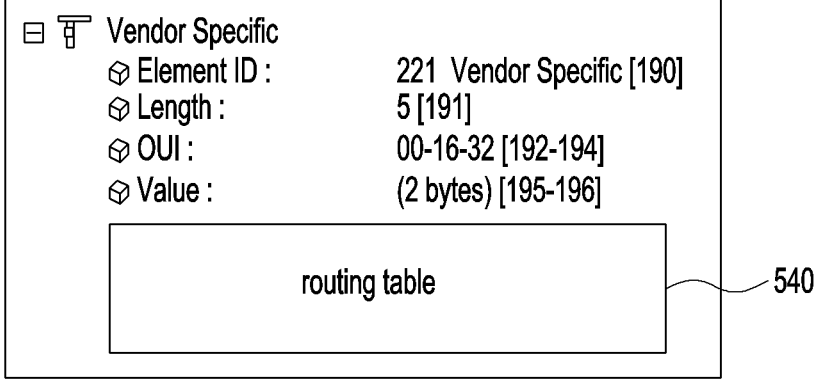

Referring to FIG. 5D, a first beacon signal 504 (e.g., the VSIE of the first beacon signal) may include information 540 about a routing table that is updated by the first electronic device 201 based on the network state of the at least one electronic device included in the mesh network.

Figure 6A:
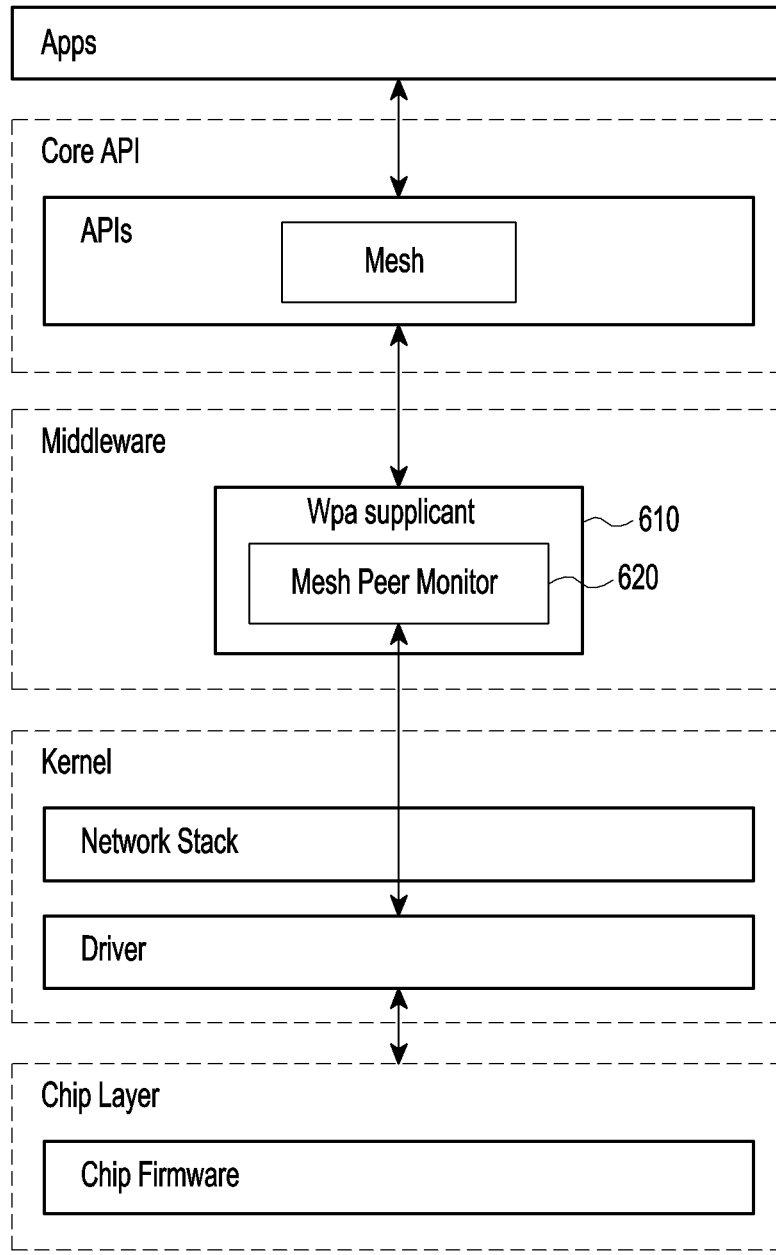
FIGS. 6A, 6B and 6C are diagrams illustrating an example operation of determining a network state of electronic devices that are adjacent to a first electronic device, according to various embodiments of the disclosure.
Figure 6B:
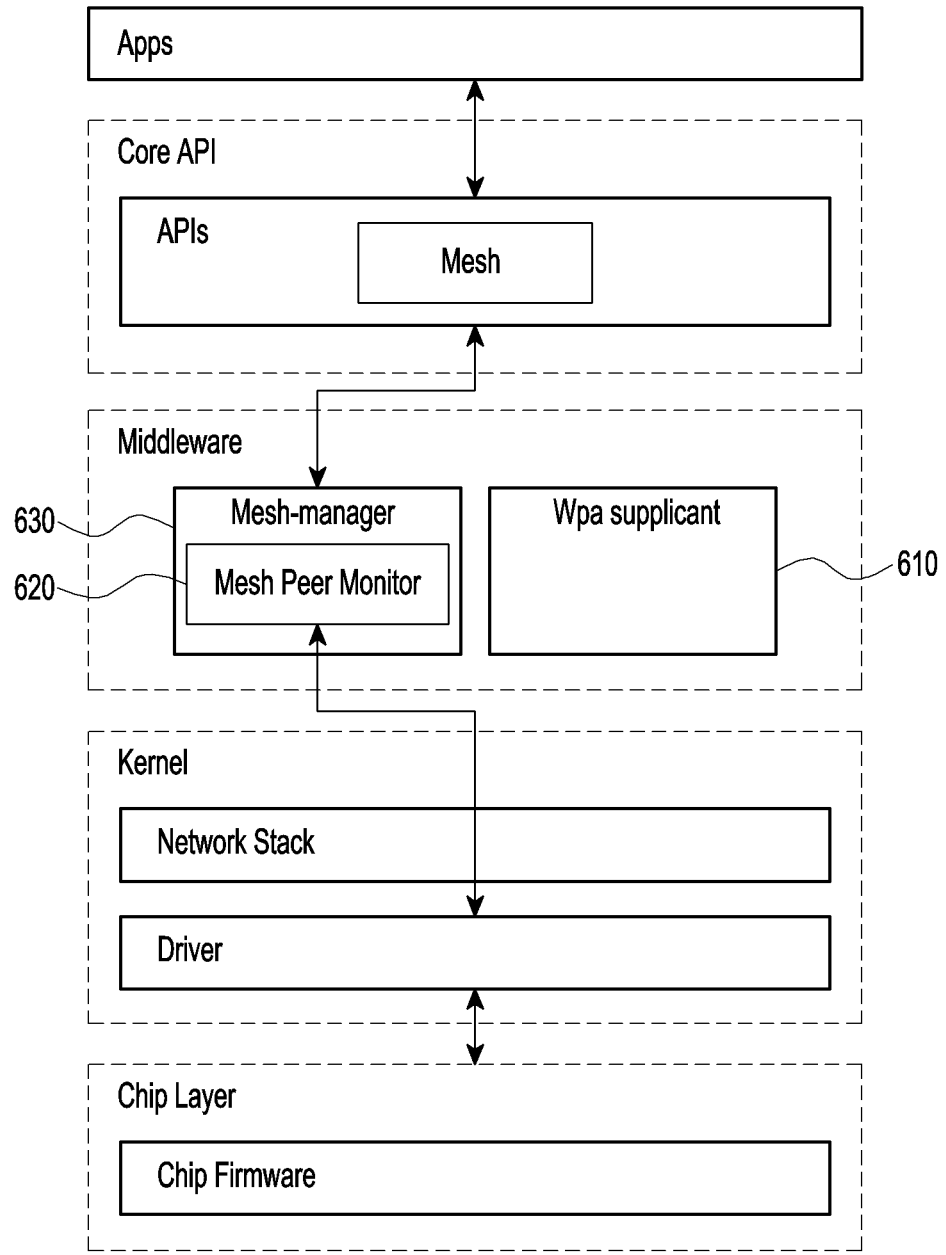
Figure 6C:
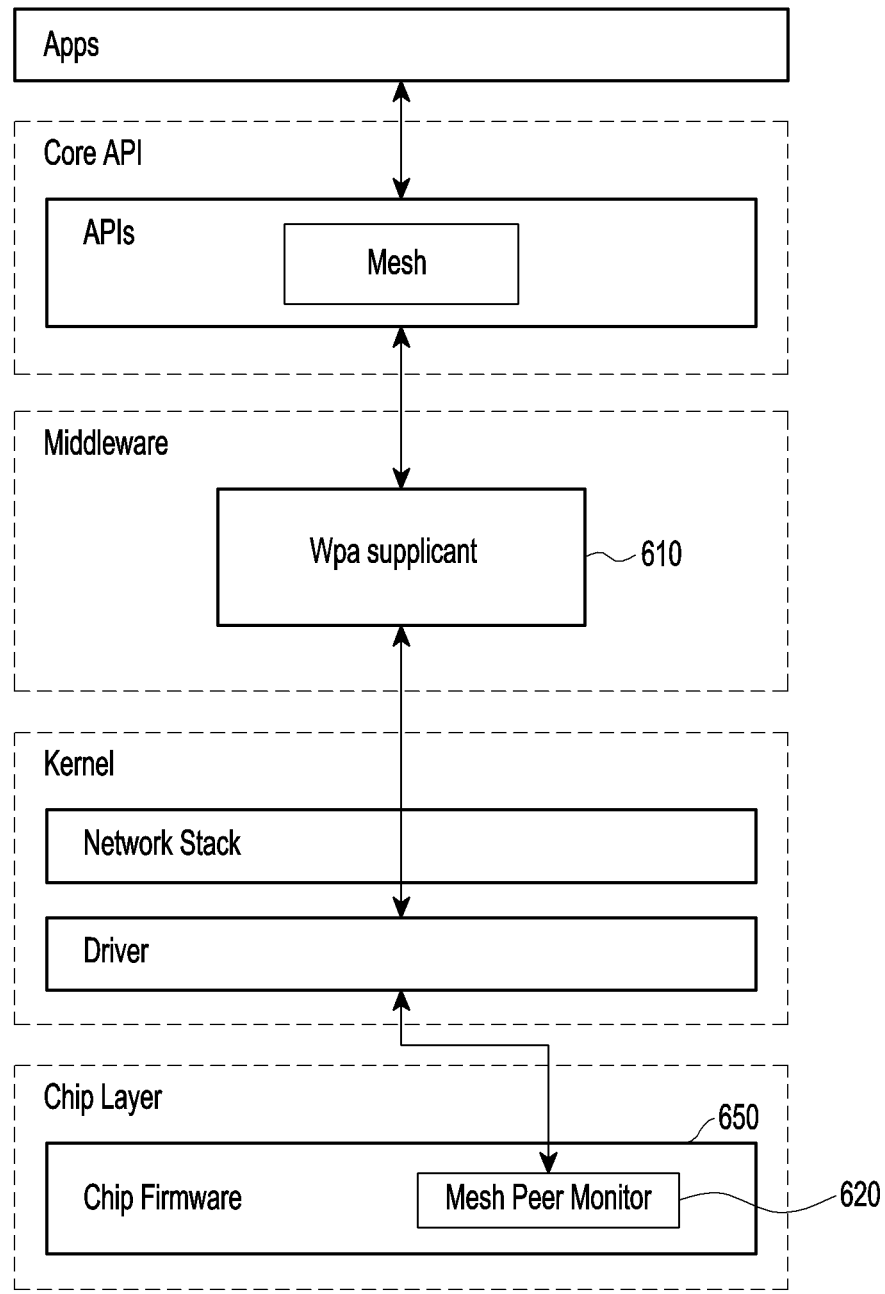

FIGS. 6A, 6B and 6C are diagrams illustrating an example operation of determining a network state of electronic devices that are adjacent to a first electronic device, according to various embodiments of the disclosure.

Referring to FIGS. 6A, 6B and 6C, a first electronic device (e.g., the first electronic device 201 of FIG. 2) may monitor a beacon signal output from at least one electronic device included in a mesh network through a mesh peer monitor module 620. For example, the mesh peer monitor module 620 may be implemented in various forms.

Meanwhile, an open source implementation project, open 80211s, of the wireless mesh standard of the IEEE 802.11s defines to enable communication with a user-space demon, a wpa_supplicant module 610, through an NL80211 interface of a Linux kernel.

Referring to FIG. 6A, the mesh peer monitor module 620 may be included in the wpa_supplicant module 610.

According to various embodiments, the mesh peer monitor module 620 included in the wpa_supplicant module 610 may determine whether a beacon signal output from at least one electronic device included in the mesh network is received and inform a user application of a monitoring result. For example, the mesh peer monitor module 620 may inform the user application that the network state of the electronic device is the inactive state, when the beacon signal output from an adjacent electronic device (or node) is not received during a designated time.

Referring to FIG. 6B, the mesh peer monitor module 620 may be implemented with a separate program.

According to various embodiments, the mesh peer monitor module 620 included implemented with a program 630 (e.g., a mesh manager program) that is separate from that of the wpa_supplicant module 610 may determine whether the beacon signal output from the at least one electronic device included in the mesh network is received, and inform the user application of a monitoring result. For example, the mesh peer monitor module 620 may inform the user application that the network state of the electronic device is the inactive state, when the beacon signal output from an adjacent electronic device (or node) is not received during a designated time.

Referring to FIG. 6C, the mesh peer monitor module 620 may be implemented through chip firmware. That is, the mesh peer monitor module 620 may be offloaded to a chip (e.g., WiFi chip) of a communication circuit (e.g., the communication circuit 290 of FIG. 2A). The first electronic device 201 may wake up a host (e.g., the processor 220) when the network state of the at least one electronic device included in the mesh network is determined to be the inactive state. In this way, the first electronic device 201 may reduce power consumption of the host (e.g., the processor 220).

According to various embodiments, the mesh peer monitor module 620 included in the chip firmware 650 may determine whether the beacon signal output from the at least one electronic device included in the mesh network is received and inform the user application of a monitoring result through the wpa_supplicant module 610. For example, the mesh peer monitor module 620 may inform the user application that the network state of the electronic device is the inactive state, through the wpa_supplicant module 610, when the beacon signal output from an adjacent electronic device (or node) is not received during a designated time.

Figure 7:
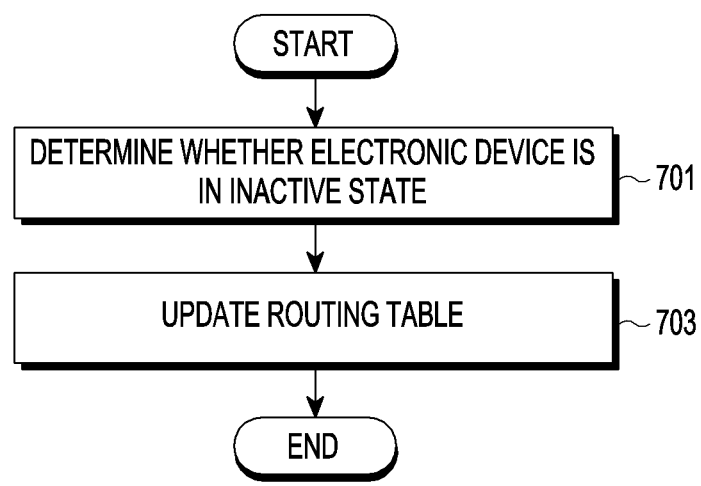
FIG. 7 is a flowchart illustrating an example operation, performed by an electronic device, of updating a routing table, according to various embodiments of the disclosure.

FIG. 7 is a flowchart illustrating an example operation, performed by an electronic device, of updating a routing table, according to various embodiments of the disclosure.

Referring to FIG. 7, a first electronic device (e.g., the first electronic device 201 of FIG. 2A) may determine whether at least one electronic device included in the mesh network is in the inactive state, in operation 701. For example, the first electronic device 201 may monitor a beacon signal of a second electronic device (e.g., the second electronic device 202 of FIG. 2A) included in the mesh network and determine the network state of the second electronic device 202 to be the inactive state.

When determining that the network state of the second electronic device 202 is the inactive state, the first electronic device 201 may update a routing table in operation 703. For example, the first electronic device 201 may change the first path including the second electronic device 202 among the plurality of paths included in the mesh network into the inactive state. The first electronic device 201 may reset a routing path except for the first path and update the routing table according to the reset routing path.

The first electronic device 201 may, for example, add information about the updated routing table to the first beacon signal (e.g., the VSIE of the first beacon signal). The first electronic device may broadcast the first beacon signal including information about the updated routing table to at least one adjacent electronic device.

Figure 8A:
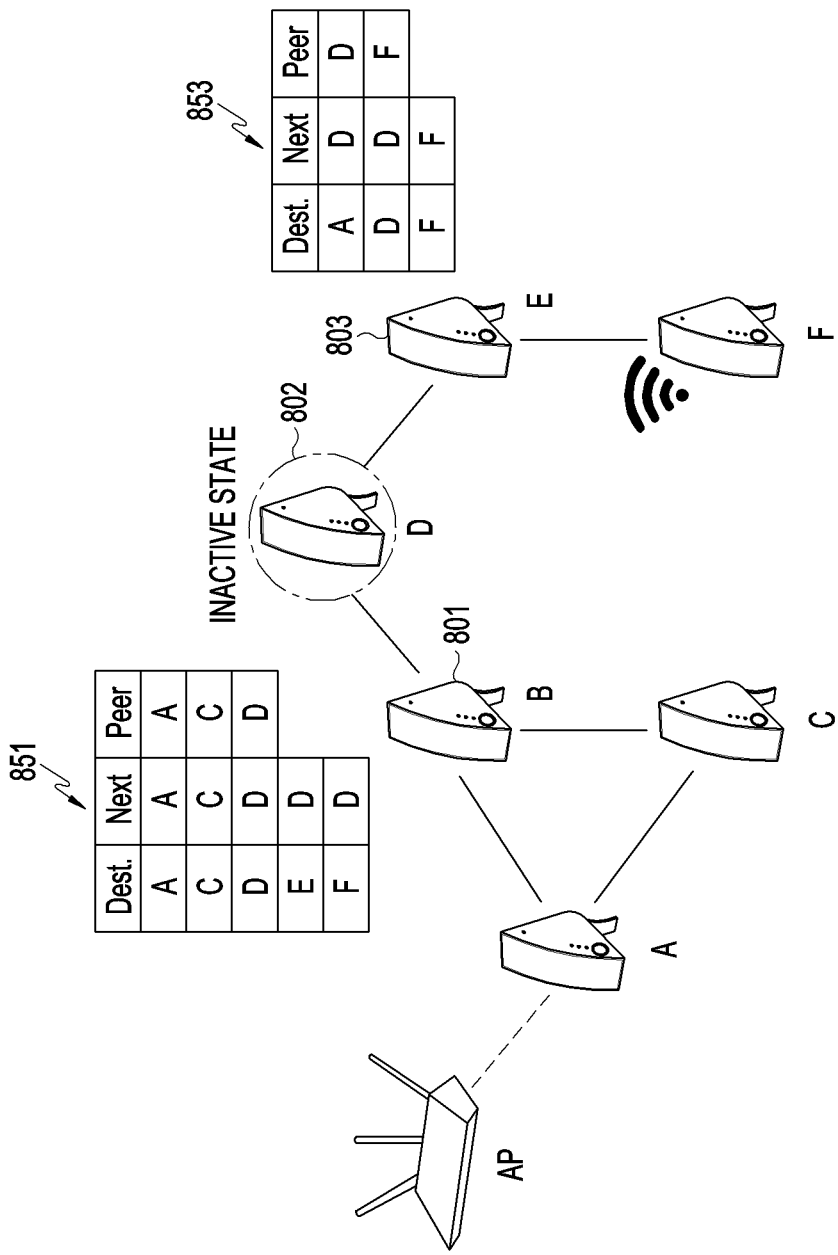
FIGS. 8A, 8B and 8C are diagrams illustrating an example operation, performed by an electronic device, of updating a routing table, according to various embodiments of the disclosure.
Figure 8B:
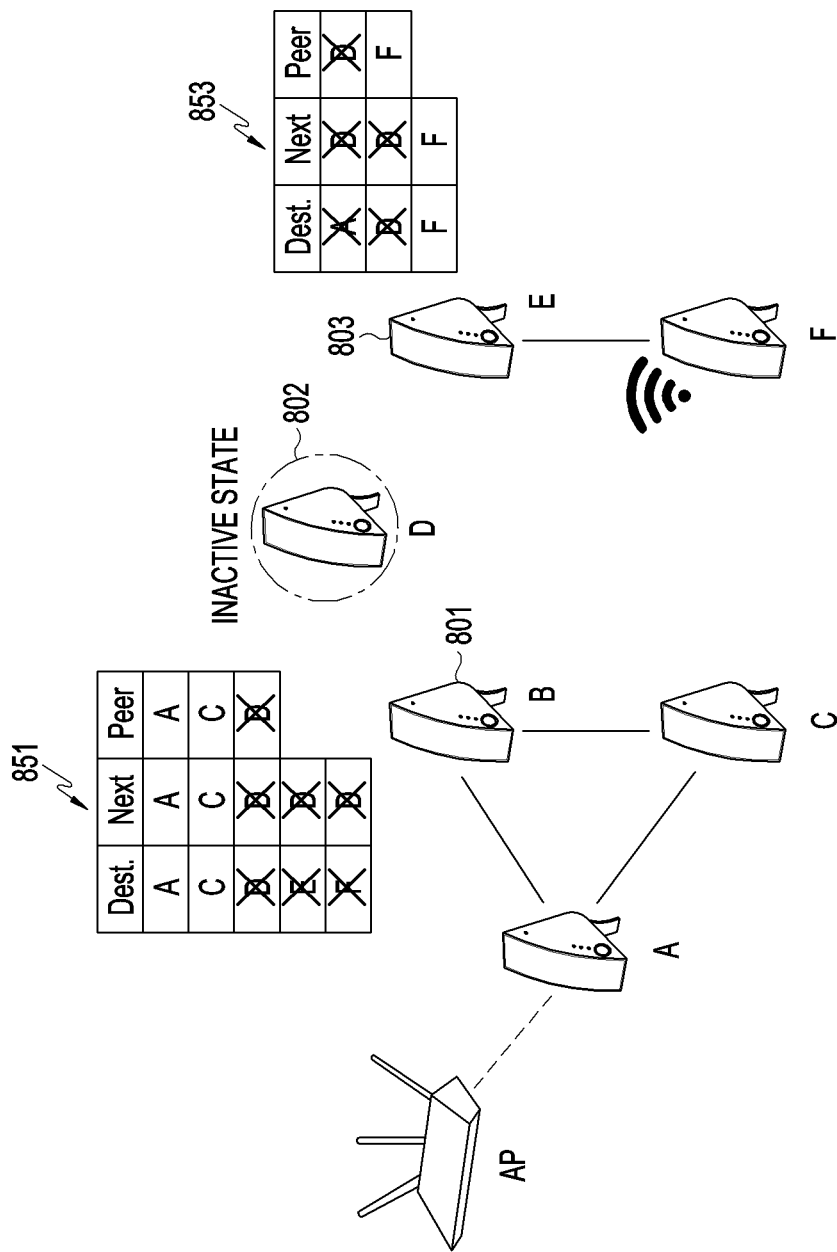
Figure 8C:
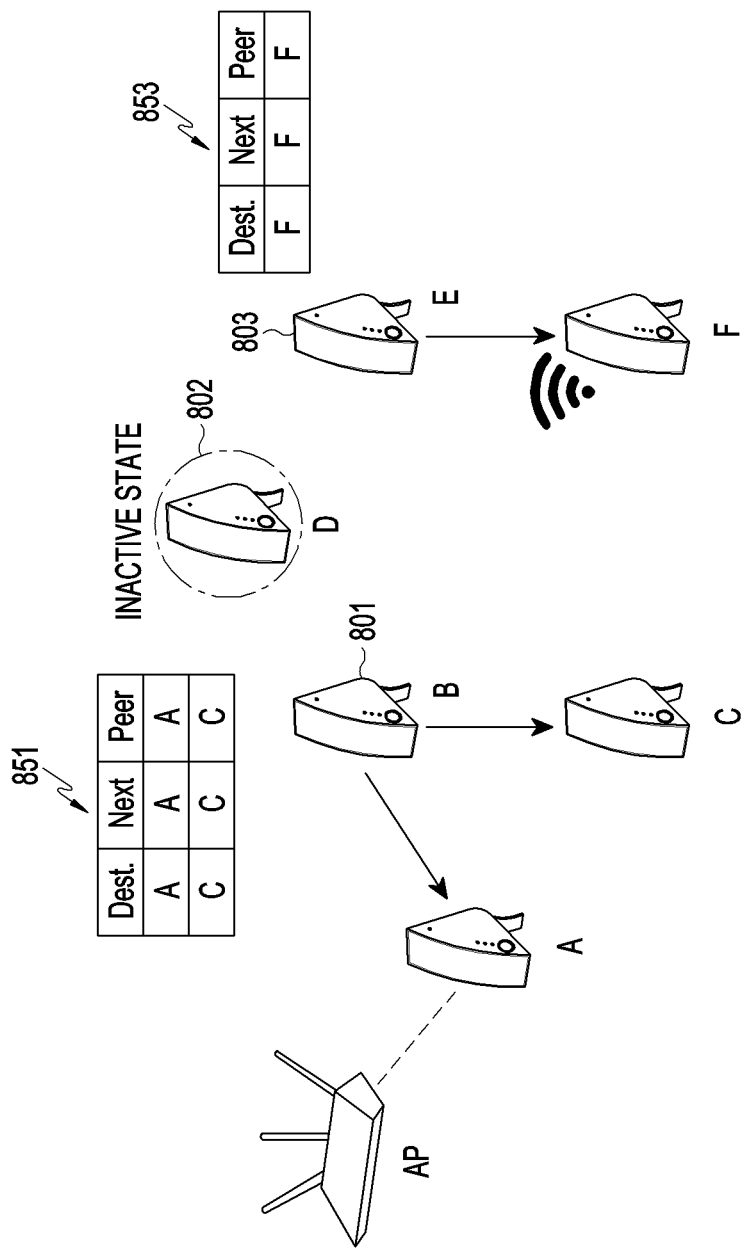

FIGS. 8A, 8B and 8C are diagrams illustrating an example operation, performed by an electronic device, of updating a routing table, according to various embodiments of the disclosure.

Referring to FIGS. 8A, 8B and 8C, a mesh network including a plurality of devices (e.g., devices A, B, C, D, E and F) may be formed.

Referring to FIG. 8A, each of the plurality of devices included in the mesh network may store a routing table for paths included in the mesh network. For example, a first electronic device 801 (e.g., device B) may store a first routing table 851 for the paths included in the mesh network. A third electronic device 803 (e.g., device E) may store a third routing table 853 for the paths included in the mesh network.

When a second electronic device 802 (e.g., device D) is in the inactive state, the first electronic device 801 and the third electronic device 803 may not receive a beacon signal output from the second electronic device 802 at preset intervals as would be normal. For example, when failing to receive the beacon signal from the second electronic device 802 during a designated time, the first electronic device 801 and the third electronic device 803 may determine that the network state of the second electronic device 802 is the inactive state.

Referring to FIG. 8B, when determining that the second electronic device 802 is in the inactive state, the first electronic device 801 may determine that a path including the second electronic device 802 is in the inactive state. The first electronic device 801 may update the first routing table 851 by excluding any path including the second electronic device 802.

Likewise, when determining that the second electronic device 802 is in the inactive state, the third electronic device 803 may determine that any path including the second electronic device 802 is in the inactive state. The third electronic device 803 may update the first routing table 853 by excluding the path including the second electronic device 802.

Referring to FIG. 8C, the first electronic device 801 may broadcast a first beacon signal (e.g., a beacon signal output from the first electronic device 801) including information indicating a network state of the second electronic device 802 to adjacent electronic devices (e.g., devices 'A' and 'C'). The first electronic device 801 may broadcast information about the updated routing table 851 through the first beacon signal.

The third electronic device 803 may broadcast a third beacon signal (e.g., a beacon signal output from the third electronic device 803) including information indicating a network state of the second electronic device 802 to an adjacent electronic device (e.g., a device 'F'). The third electronic device 803 may broadcast information about the updated routing table 853 through the third beacon signal.

Figure 9:
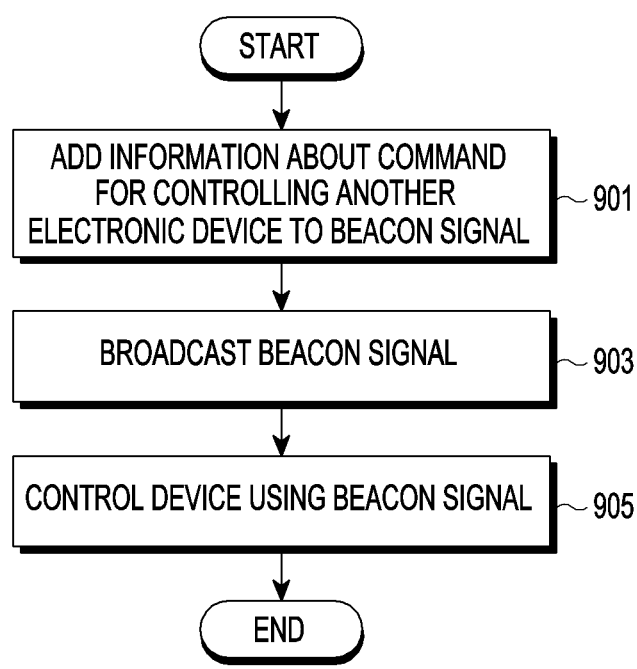
FIG. 9 is a flowchart illustrating an example operation, performed by an electronic device, of controlling another electronic device using a beacon signal, according to various embodiments of the disclosure.

FIG. 9 is a flowchart illustrating an example operation, performed by an electronic device, of controlling another electronic device using a beacon signal, according to various embodiments of the disclosure.

Referring to FIG. 9, a first electronic device (e.g., the first electronic device 201 of FIG. 2A) may add information about a command for controlling another electronic device included in the mesh network to a beacon signal output at preset intervals, in operation 901. For example, the information about the command may refer, for example, to a command for controlling a particular electronic device included in the mesh network to perform a particular operation. When the particular electronic device is a speaker, the information about the command may include a command for playing music, a command for stopping playing music, and/or a command for controlling a volume.

The first electronic device 201 may broadcast a beacon signal to at least one adjacent electronic device, in operation 903. The command included in the beacon signal may be transmitted to the particular electronic device through at least one of the electronic devices included in the mesh network.

The first electronic device 201 may control the particular device using the beacon signal, in operation 905. For example, the first electronic device 201 may control the particular device using the beacon signal, without transmitting a separate frame for controlling the particular device.

According to various embodiments, the first electronic device 201 may add the information about the command for controlling another electronic device included in the mesh network to, for example, a VSIE of an action frame. The first electronic device 201 may transmit the action frame including the information about the command to an adjacent electronic device.

Figure 10A:
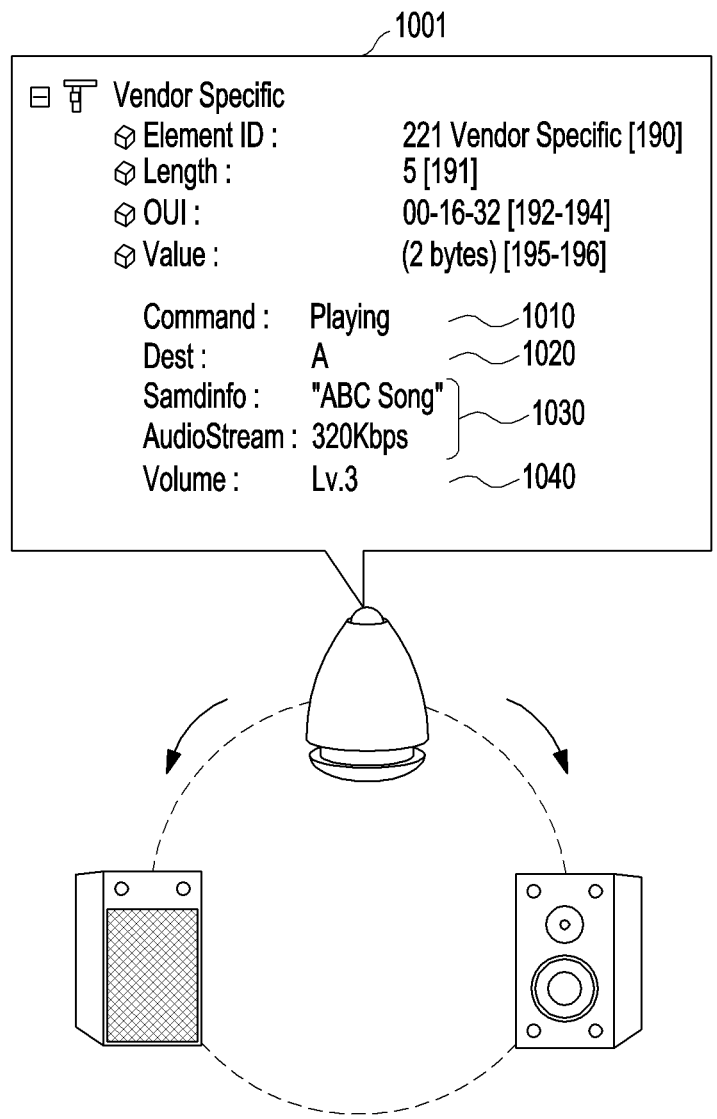
FIGS. 10A and 10B are diagrams illustrating an example operation, performed by an electronic device, of controlling another electronic device using a beacon signal, according to various embodiments of the disclosure.
Figure 10B:
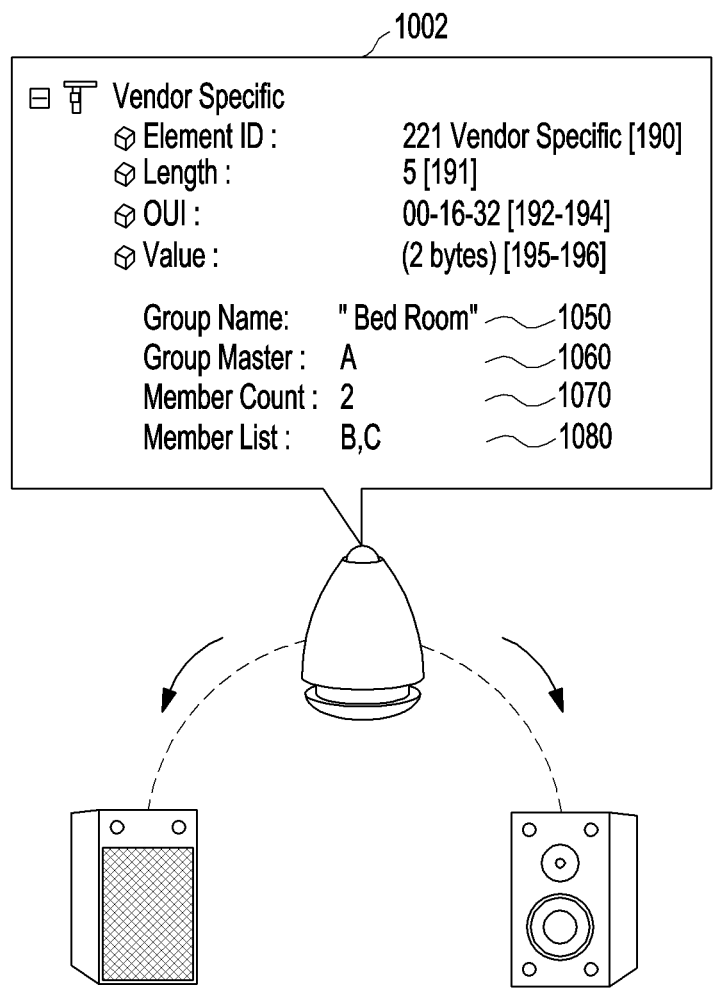

FIGS. 10A and 10B are diagrams illustrating an example operation, performed by an electronic device, of controlling another electronic device using a beacon signal, according to various embodiments of the disclosure.

Referring to FIG. 10A, the electronic device may add information about a command for controlling another electronic device to a beacon signal output at preset intervals. The electronic device may broadcast the beacon signal including the information about the command to adjacent electronic devices.

According to various embodiments, a first beacon signal 1001 (e.g., a VSIE of the first beacon signal) may include the information about the command for controlling the particular device. For example, when the particular device that is a target of the command is a speaker, the first beacon signal 1001 may include a command 1010 for "playing" a sound source and information 1020 indicating that the particular device that is the target of the command is a device "A". The first beacon signal 1001 may include information 1030 (e.g., a title and an audio stream) of a sound source to be "played" and a command 1040 for a "volume" of the sound source to be played.

Referring to FIG. 10B, the electronic device may add information about a state of electronic devices included in the mesh network to a beacon signal output at preset intervals. The electronic device may broadcast the beacon signal including the information about the state to adjacent electronic devices.

According to various embodiments, a second beacon signal 1002 (e.g., a VSIE of the second beacon signal) may include information about the state of the electronic devices included in the mesh network. For example, when the particular device that is a target of the command is a speaker, the second beacon signal 1002 may include information about "a group name" 1050 (e.g., 'Bed Room') of speakers, and may include information 1060 (e.g., 'A') indicating a name of a device that is a master of the group. The second beacon signal 1002 may include information 1070 (e.g., '2') indicating the "number" of group members and information 1080 (e.g., 'B' and 'C') indicating names of the group members.

Figure 11:
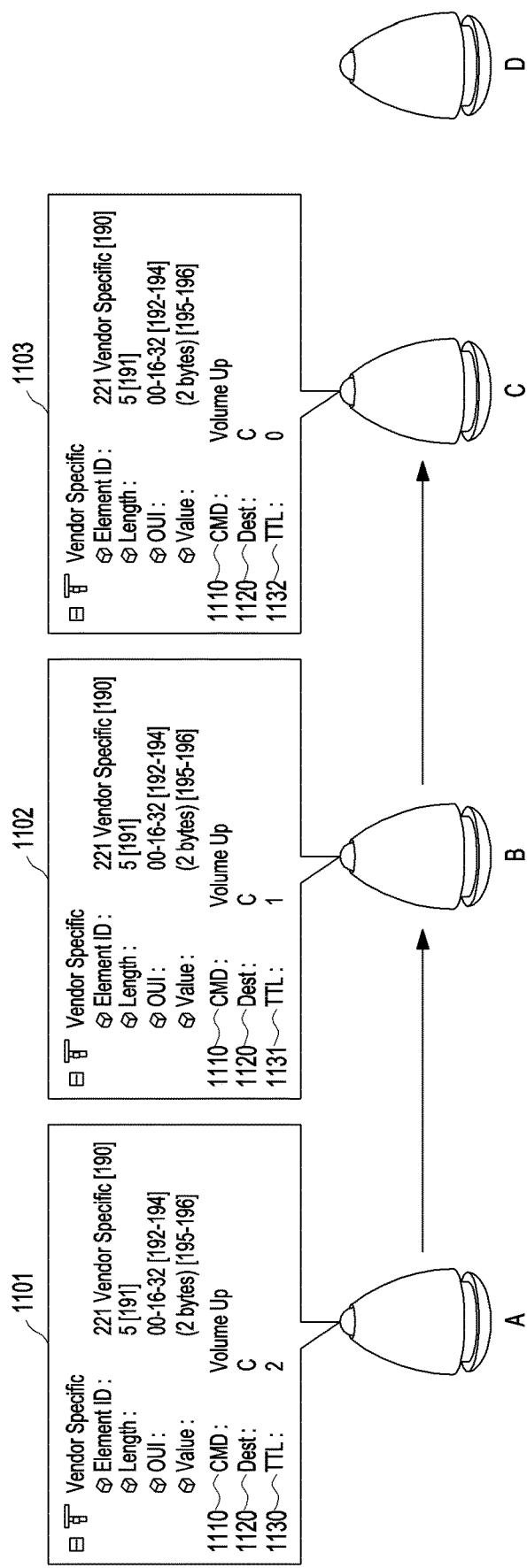
FIG. 11 is a diagram illustrating an example operation, performed by an electronic device, of controlling another electronic device using a beacon signal, according to various embodiments of the disclosure.

FIG. 11 is a diagram illustrating an example operation, performed by an electronic device, of controlling another electronic device using a beacon signal, according to various embodiments of the disclosure.

Referring to FIG. 11, the electronic device may broadcast a beacon signal including information about a command for controlling a particular electronic device included in the mesh network to adjacent electronic devices.

The electronic device included in the mesh network may receive a beacon signal output from another electronic device, and identify the information about the command included in the received beacon signal. When a target device for the command is not the electronic device, the electronic device may relay the received beacon signal to another adjacent electronic device.

According to various embodiments, the device 'A' may transmit a first beacon signal 1101 (e.g., a VSIE of the first beacon signal) to the adjacent device 'B'. The first beacon signal 1101 may include information 1110 about a command (e.g., 'Volume Up') for increasing a volume and information 1120 about a target device for the command (e.g., the device 'C'). The first beacon signal 1101 may include information 1130 (e.g., a time-to-live (TTL) value) for relaying the beacon signal. For example, the TTL value may be reduced by '1' each time when a signal is relayed once. The first beacon signal 1101 may be relayed to another electronic device until the TTL value becomes '0'. For example, the TTL value of the first beacon signal 1101 may be determined based on a routing path of the mesh network. The TTL value of the first beacon signal 1101 output from the device 'A' may be '2'.

The device 'B' may receive a first electrode signal 1102. The first beacon signal 1102 received by the device 'B' may include the same contents as the first beacon signal 1101 output from the device 'A' except for a TTL value. The device 'B' may identify information about a command of the first beacon signal 1102. When the device 'B' is not a target device of the command included in the first beacon signal 1102, the device 'B' may transmit the first beacon signal 1102 to another adjacent device (e.g., the device 'C'). The TTL value of the first beacon signal 1102 received by the device 'B' may be '1'.

The device 'C' may receive a first electrode signal 1103. The first beacon signal 1103 received by the device 'C' may include the same contents as the first beacon signal 1101 output from the device 'A' except for a TTL value. The device 'C' may identify information about a command of the first beacon signal 1103. When the device 'C' is a target device of the command included in the first beacon signal 1103, the device 'C' may not transmit the first beacon signal 1103 to adjacent another device (e.g., the device 'D'). The TTL value of the first beacon signal 1103 received by device 'C' may be '0'.

The device 'C' may increase the volume based on the command included in the first beacon signal 1103. In this way, the device 'A' may control an operation of the device 'C' using the beacon signal, without transmitting a separate frame for a command.

Figure 12:
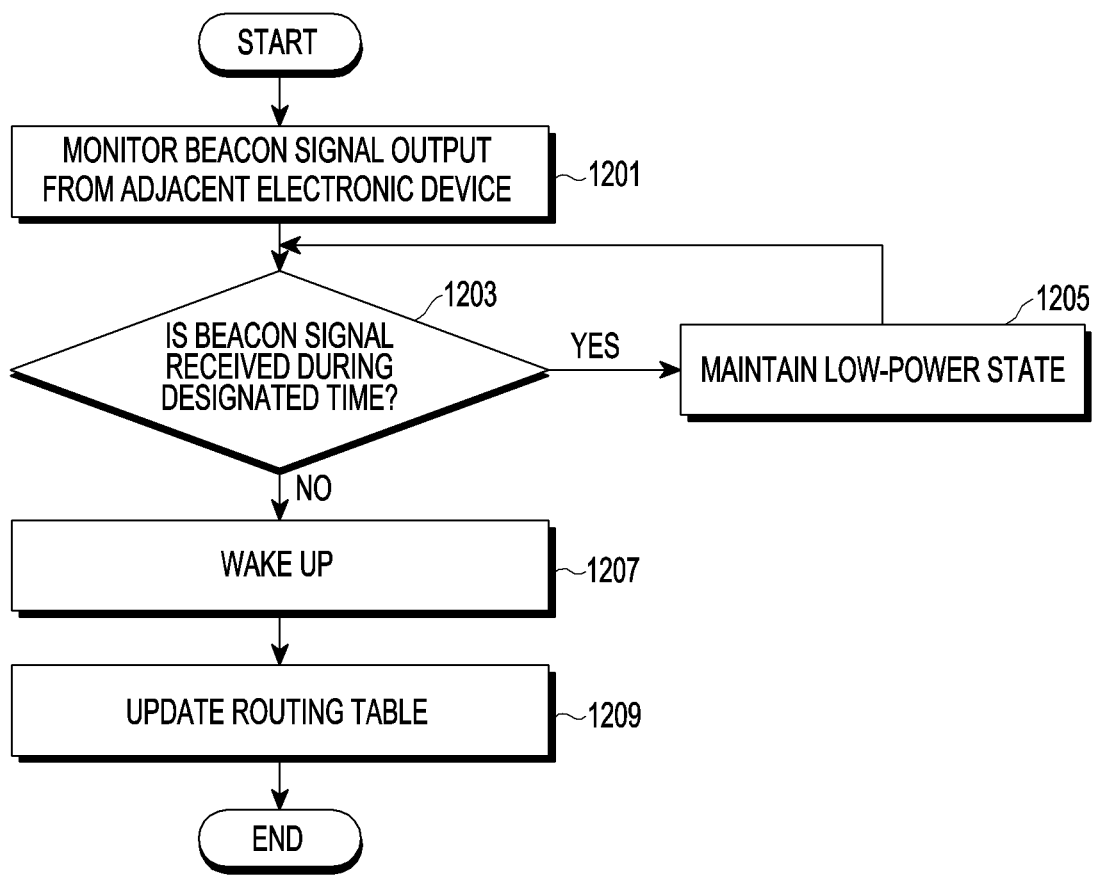
FIG. 12 is a flowchart illustrating an example operation, performed by an electronic device, of maintaining a low-power state, according to various embodiments of the disclosure.

FIG. 12 is a flowchart illustrating an example operation, performed by an electronic device, of maintaining a low-power state, according to various embodiments of the disclosure.

Referring to FIG. 12, a first electronic device may monitor a second beacon signal output from an adjacent second electronic device included in the mesh network, in operation 1201. For example, the first electronic device may monitor the second beacon signal output from the adjacent second electronic device included in the mesh network, in the sleep mode (or the low-power state). The first electronic device may also monitor the second beacon signal output from the adjacent second electronic device included in the mesh network through a communication circuit, while driving a processor in the sleep mode (or the low-power state) (e.g., applicable in the embodiment of FIG. 6C).

The first electronic device may determine whether the second beacon signal is received during a designated time, in operation 1203.

When receiving the second beacon signal during the designated time (yes in operation 1203), the first electronic device may maintain the low-power state in operation 1205.

When failing to receive the second beacon signal during the designated time (no in operation 1203), the first electronic device may wake up the processor from the sleep mode in operation 1207. For example, the communication circuit may wake up the processor when failing to receive the second beacon signal during the designated time.

The first electronic device may update the information about the second electronic device after waking up from the sleep mode. For example, the first electronic device may determine the network state of the second electronic device to be the inactive state. The first electronic device may update the routing table by excluding a path including the second electronic device, in operation 1209.

Figure 13:
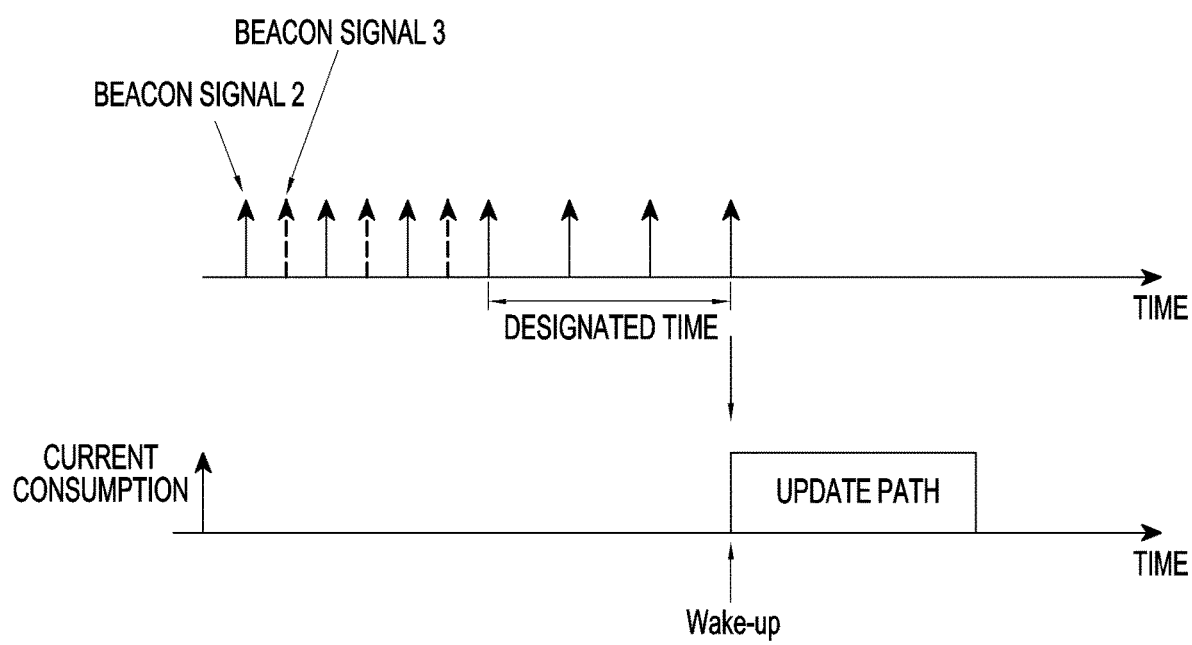
FIG. 13 is a diagram illustrating an example operation, performed by an electronic device, of maintaining a low-power state, according to various embodiments of the disclosure.

FIG. 13 is a diagram illustrating an example operation, performed by an electronic device, of maintaining a low-power state, according to various embodiments of the disclosure.

Referring to FIG. 13, the first electronic device may monitor the second beacon signal and the third beacon signal that are respectively output from the adjacent second electronic device and third electronic device included in the mesh network, in the sleep mode (or the low-power state). The first electronic device may monitor the second beacon signal and the third beacon signal that are respectively output from the adjacent second electronic device and third electronic device included in the mesh network, through the communication circuit, while driving the processor in the sleep mode (or the low-power state).

When at least one of the second beacon signal or the third beacon signal (e.g., the third beacon signal) is not received during the designated time, the communication circuit of the first electronic device may wake up the processor. After waking up, the processor may determine that the network state of the third electronic device corresponding to the third beacon signal is the inactive state. The processor may update the routing path by excluding a path including the third electronic device.

Figure 14:
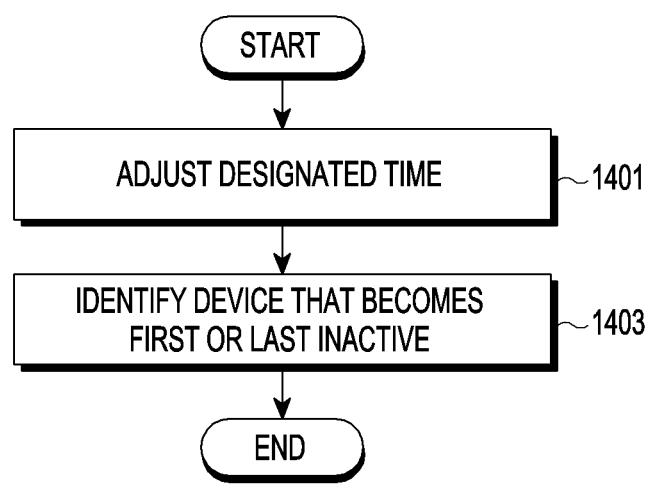
FIG. 14 is a flowchart illustrating an example operation, performed by an electronic device, of adjusting a designated time for a beacon signal, according to various embodiments of the disclosure.

FIG. 14 is a flowchart illustrating an example operation, performed by an electronic device, of adjusting a designated time for a beacon signal, according to various embodiments of the disclosure.

Referring to FIG. 14, the electronic device may adjust a designated time for a beacon signal for determining whether an adjacent electronic device is inactive, in operation 1401. For example, the designated time may be adjusted at least based on a data rate of data transmitted and received by the electronic device. The electronic device may reduce the designated time when the data rate of the transmitted and received data is high. The electronic device may increase the designated time when the data rate of the transmitted and received data is low.

The electronic device may identify an electronic device that becomes first or last inactive among adjacent electronic devices by increasing or reducing the designated time, in operation 1403. The electronic device may also identify network states of the electronic devices included in the mesh network by increasing or reducing a designated time.

An electronic device according to various embodiments of the disclosure includes a communication circuit configured to perform WiFi communication and a processor, wherein the processor is configured to control the electronic device to: monitor a second beacon signal output from a second electronic device at preset intervals through the communication circuit, determine that a network state of the second electronic device is an inactive state based on the second beacon signal not being received during a designated time, and broadcast a first beacon signal including first information indicating that the network state of the second electronic device is the inactive state to at least one other electronic device, through the communication circuit.

The processor may be configured to control the electronic device to add the first information to a vendor specific information element (VSIE) of the first beacon signal.

The processor may be configured to control the electronic device to transmit an action frame including first information indicating that the network state of the second electronic device is the inactive state.

The processor may be configured to control the electronic device to change a first path including the second electronic device into the inactive state based on the second beacon signal not being received during the designated time.

The processor may be configured to control the electronic device to reset a routing path other than the first path including the second electronic device based on determining that the network state of the second electronic device is the inactive state.

The processor may be configured to control the electronic device to broadcast the first beacon signal including the reset routing path to at least one other electronic device based on the second beacon signal not being received during the designated time.

The processor may be configured to control the electronic device to determine the network state of the second electronic device to be the inactive state based on a preset number of beacon signals not being received from the second electronic device during a designated time.

The first information may include a number of second beacon signals that are not normally received at the preset intervals.

The first information may include information about a time during which the second beacon signal is not received from the second electronic device.

The VSIE of the first beacon signal may include information for controlling at least one another electronic device.

The processor may be configured to control the electronic device to adjust the designated time for the second beacon signal.

The processor may be configured to control the electronic device to adjust the designated time at least based on a data rate of data transmitted and received by the first electronic device.

The processor may be configured to control the electronic device to monitor whether the second beacon signal output from the second electronic device is received during the designated time, through a wpa_supplicant module.

The communication circuit may be configured to wake up the processor based on the second beacon signal not being received during the designated time, and the processor may be configured to control the electronic device to update information about the second electronic device after waking up.

An method of operating an electronic device according to various embodiments of the disclosure includes monitoring a second beacon signal output from a second electronic device at preset intervals through a communication circuit of a first electronic device, determining that a network state of the second electronic device is an inactive state based on the second beacon signal not being received during a designated time, and broadcasting a first beacon signal including first information indicating that the network state of the second electronic device is the inactive state to at least one other electronic device through the communication circuit.

The broadcasting of the first beacon signal may include adding the first information to a VSIE of the first beacon signal.

The method of operating the electronic device may further include resetting a routing path other than the first path including the second electronic device based on determining that the network state of the second electronic device is the inactive state.

The first information may include a number of second beacon signals that are not normally received at the preset intervals.

The first information may include information about a time during which the second beacon signal is not received from the second electronic device.

The VSIE of the first beacon signal may include information for controlling at least one another electronic device.

The electronic device according to various example embodiments of the disclosure may determine whether a particular electronic device included in a mesh network using, for example, WiFi communication is in an inactive state, working on maintenance of the WiFi mesh network.

Each of the foregoing elements of the electronic device may be configured with one or more components, names of which may vary with a type of the electronic device. In various example embodiments, the electronic device may include at least one of the foregoing elements, some of which may be omitted or to which other elements may be added. In addition, some of the elements of the electronic device according to various example embodiments may be integrated into one entity to perform functions of the corresponding elements in the same manner as before they are integrated.

The various example embodiments disclosed herein have been provided for description and understanding of disclosure, and are not intended to limit the scope of the present disclosure. Therefore, it should be understood that the scope of the present disclosure includes various changes in form and detail based on the technical spirit of the present disclosure.

What is claimed is:

1. An electronic device comprising:
   a communication circuit configured to perform wireless communication; and
   a processor,
   wherein the processor is configured to control the electronic device to:
     monitor a second beacon signal output from a second electronic device through the communication circuit;
     determine that a network state of the second electronic device is an inactive state based on the second beacon signal not being received during a designated time; and
     broadcast a first beacon signal comprising first information indicating that the network state of the second electronic device is the inactive state to at least one other electronic device, through the communication circuit.

2. The electronic device of claim 1, wherein the processor is configured to control the electronic device to add the first information to a vendor specific information element (VSIE) of the first beacon signal.

3. The electronic device of claim 1, wherein the processor is configured to control the electronic device to transmit an action frame comprising first information indicating that the network state of the second electronic device is the inactive state.

4. The electronic device of claim 1, wherein the processor is configured to control the electronic device to change a first path comprising the second electronic device into the inactive state based on the second beacon signal not being received during the designated time.

5. The electronic device of claim 1, wherein the processor is configured to control the electronic device to reset a routing path other than a first path comprising the second electronic device based on determining that the network state of the second electronic device is the inactive state.

6. The electronic device of claim 5, wherein the processor is configured to control the electronic device to broadcast the first beacon signal comprising the reset routing path to at least one other electronic device based on the second beacon signal not being received during the designated time.

7. The electronic device of claim 1, wherein the processor is configured to control the electronic device to determine the network state of the second electronic device to be the inactive state based on a preset number of beacon signals not being received from the second electronic device during a designated time.

8. The electronic device of claim 1, wherein the first information comprises a number of second beacon signals that are not normally received.

9. The electronic device of claim 1, wherein the first information comprises information about a time during which the second beacon signal is not received from the second electronic device.

10. The electronic device of claim 1, wherein a vendor specific information element (VSIE) of the first beacon signal comprises information for controlling at least one other electronic device.

11. The electronic device of claim 1, wherein the processor is configured to control the electronic device to adjust the designated time for the second beacon signal.

12. The electronic device of claim 1, wherein the processor is configured to control the electronic device to adjust the designated time at least based on a data rate of data transmitted and received by the electronic device.

13. The electronic device of claim 1, wherein the processor is configured to control the electronic device to monitor whether the second beacon signal output from the second electronic device is received during the designated time through a wpa_supplicant module.

14. The electronic device of claim 1, wherein the communication circuit is configured to wake up the processor based on the second beacon signal not being received during the designated time, and the processor is configured to control the electronic device to update information about the second electronic device after waking up.

15. A method of operating an electronic device, the method comprising:
   monitoring a second beacon signal output from a second electronic device through a communication circuit of the electronic device;
   determining that a network state of the second electronic device is an inactive state based on the second beacon signal not being received during a designated time; and
   broadcasting a first beacon signal comprising first information indicating that the network state of the second electronic device is the inactive state to at least one other electronic device through the communication circuit.

16. The method of claim 15, wherein the broadcasting of the first beacon signal comprises adding the first information to a vendor specific information element (VSIE) of the first beacon signal.

17. The method of claim 15, further comprising resetting a routing path other than a first path comprising the second electronic device based on determining that the network state of the second electronic device is the inactive state.

18. The method of claim 15, wherein the first information comprises a number of second beacon signals that are not normally received.

19. The method of claim 15, wherein the first information comprises information about a time during which the second beacon signal is not received from the second electronic device.

20. The method of claim 15, wherein a vendor specific information element (VSIE) of the first beacon signal comprises information for controlling at least one other electronic device.

* * * * *